United States Patent
Weinlich et al.

(10) Patent No.: US 12,326,493 B2
(45) Date of Patent: Jun. 10, 2025

(54) METHOD AND DEVICE FOR DETERMINING VEHICLE PARAMETERS

(71) Applicant: Continental Automotive GmbH, Hannover (DE)

(72) Inventors: Andreas Weinlich, Schwalbach a. Ts. (DE); Thomas Smits, Schwalbach a. Ts. (DE); Marten Kabutz, Schwalbach a. Ts. (DE); Tobias Schmalriede, Schwalbach a. Ts. (DE)

(73) Assignee: Continental Automotive Technologies GmbH, Hannover (DE)

( * ) Notice: Subject to any disclaimer, the term of this patent is extended or adjusted under 35 U.S.C. 154(b) by 965 days.

(21) Appl. No.: 16/951,890

(22) Filed: Nov. 18, 2020

(65) Prior Publication Data
US 2021/0072364 A1    Mar. 11, 2021

Related U.S. Application Data

(63) Continuation of application No. PCT/EP2019/063204, filed on May 22, 2019.

(30) Foreign Application Priority Data

May 29, 2018   (DE) .................... 10 2018 208 526.9

(51) Int. Cl.
*G01S 11/00*   (2006.01)
*G01S 11/06*   (2006.01)
(Continued)

(52) U.S. Cl.
CPC ............... *G01S 11/06* (2013.01); *G01S 11/00* (2013.01); *B60R 11/04* (2013.01); *G01B 15/00* (2013.01); *H04N 23/54* (2023.01)

(58) Field of Classification Search
CPC ........ G01S 13/931; G01S 13/08; G01S 11/00; G01S 11/06; G01S 5/14; H04N 23/54; G01B 15/00
(Continued)

(56) References Cited

U.S. PATENT DOCUMENTS 10,112,536 B2 *  10/2018  Jones ..................... H04N 7/181
10,168,708 B2 *   1/2019  Cohen .................. B60W 50/14
(Continued)

FOREIGN PATENT DOCUMENTS

DE    102014204924 A1    9/2014
DE    102014212821 A1    1/2016
(Continued)

OTHER PUBLICATIONS

Stefan Pfeiffer, "Distance measurement using time-of-flight measurement in wireless sensor networks", Thesis, Dec. 15, 2010, Free University of Berlin Institute of Information Science.
(Continued)

*Primary Examiner* — Chuong P Nguyen

(57) ABSTRACT

A method comprises determining the distance between a first transceiver unit and a second transceiver unit, wherein the first transceiver unit is mounted on a vehicle and the second transceiver unit is mounted on a trailer connected to the vehicle. The method also includes determining at least one parameter relating to the trailer, taking into account the distance between the first transceiver unit and the second transceiver unit.

13 Claims, 3 Drawing Sheets

```
┌─────────────────────────────────────┐
│      Determining the distance       │
│      between a first transceiver    │    701
│  unit and a second transceiver unit │
└─────────────────────────────────────┘
                    │
                    ▼
┌─────────────────────────────────────┐
│  Determining at least one parameter │
│    relating to a trailer including  │
│  the distance between the first     │    702
│  transceiver unit and the second    │
│          transceiver unit           │
└─────────────────────────────────────┘
```

(51) Int. Cl.
 *B60R 11/04* (2006.01)
 *G01B 15/00* (2006.01)
 *H04N 23/54* (2023.01)

(58) Field of Classification Search
 USPC .......................................... 342/458, 70, 118
 See application file for complete search history.

(56) References Cited

U.S. PATENT DOCUMENTS

| | | | | |
|---|---|---|---|---|
| 10,414,221 | B2* | 9/2019 | Burkhart | B60D 1/06 |
| 11,034,200 | B2* | 6/2021 | Genheimer | B60D 1/62 |
| 11,086,333 | B2* | 8/2021 | Balogh | G05D 1/0257 |
| 11,318,884 | B2* | 5/2022 | Smits | H04N 7/18 |
| 11,693,422 | B2* | 7/2023 | Balogh | G05D 1/0246 |
| | | | | 701/23 |
| 11,872,942 | B2* | 1/2024 | Wei | G06T 7/73 |
| 12,084,107 | B2* | 9/2024 | Zimmermann | G06V 10/82 |
| 12,198,382 | B2* | 1/2025 | Critchley | G06T 7/80 |
| 2013/0307723 | A1 | 11/2013 | Garin et al. | |
| 2014/0288769 | A1 | 9/2014 | Trombley et al. | |
| 2017/0136839 | A1 | 5/2017 | Burkhart et al. | |
| 2017/0334413 | A1 | 11/2017 | Murakoshi et al. | |
| 2017/0347036 | A1* | 11/2017 | Kr?kel | H04N 23/69 |
| 2018/0025603 | A1 | 1/2018 | Tyler et al. | |
| 2018/0059209 | A1 | 3/2018 | Cuddihy et al. | |
| 2018/0097572 | A1 | 4/2018 | Shibata et al. | |
| 2019/0337342 | A1 | 11/2019 | Genheimer et al. | |
| 2023/0125045 | A1* | 4/2023 | Ma | H04N 23/90 |
| | | | | 348/148 |
| 2023/0162509 | A1* | 5/2023 | DeLizo | G01B 17/00 |
| | | | | 382/103 |
| 2023/0184953 | A1* | 6/2023 | Moak | G01S 17/42 |
| | | | | 356/4.01 |
| 2023/0215183 | A1* | 7/2023 | Bahramgiri | G06V 10/25 |
| | | | | 382/104 |
| 2023/0249673 | A1* | 8/2023 | Diessner | B60W 10/22 |
| | | | | 701/38 |
| 2024/0331193 | A1* | 10/2024 | Klinger | G06T 3/60 |

FOREIGN PATENT DOCUMENTS

| | | | | |
|---|---|---|---|---|
| DE | 102016216962 | B3 | 12/2017 | |
| JP | 2017133933 | A | 8/2017 | |
| JP | 2017210017 | A | 11/2017 | |
| JP | 2018510373 | A | 4/2018 | |
| WO | 2017036660 | A1 | 3/2017 | |
| WO | WO-2017/036660 | * | 3/2017 | ............... H04N 7/18 |
| WO | 2018060192 | A1 | 4/2018 | |
| WO | 2019042958 | A1 | 3/2019 | |

OTHER PUBLICATIONS

Stephan Mueller, "Positioning in a WLAN", Dec. 24, 2004.
International Search Report and Written Opinion dated Aug. 13, 2019 from corresponding International Patent Application No. PCT/EP2019/063204.
Office Action dated Oct. 1, 2021 from corresponding Japanese patent application No. JP 2020-566649.
European Examination Report dated Mar. 14, 2023 from corresponding European Application No. 19726945.9.
Notice of Refusal dated Oct. 29, 2024 from corresponding German patent application No. 10 2018 208 526.9.

* cited by examiner

METHOD AND DEVICE FOR DETERMINING VEHICLE PARAMETERS

CROSS REFERENCE TO RELATED APPLICATIONS

This U.S. patent application claims the benefit of PCT patent application No. PCT/EP2019/063204, filed May 22, 2019, which claims the benefit of German patent application No. 10 2018 208 526.9, filed May 29, 2018, both of which are hereby incorporated by reference.

TECHNICAL FIELD

The invention relates to a method and a device for determining vehicle parameters, in particular for determining various parameters relating to a vehicle trailer.

BACKGROUND

Many vehicles today have camera-based systems such as, for example, exterior mirror replacement systems, rear-view cameras, and surround view cameras. Such systems play a major role in terms of safety, particularly in vehicles with trailers, such as, for example, trucks or agricultural vehicles. In the case of exterior mirror replacement systems that display a dynamic image section, the correct image section, that is to say the area which is of greatest interest in the current situation, should be displayed to the driver at any point in time during the journey. This is to ensure that critical areas are displayed to the driver at all times and that he can safely recognize obstacles and potential sources of danger.

In order to be able to adapt the displayed image section to the respective driving situation at any time, the system must know various vehicle data. These are, for example, the length of the vehicle and of a trailer pulled by the vehicle or the current articulation angle between the towing vehicle and the trailer.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

The object is to provide an improved method and an improved device for determining vehicle parameters.

A method for determining parameters relating to a trailer is described. The method comprises determining the distance between a first transceiver unit and a second transceiver unit, wherein the first transceiver unit is mounted on a vehicle and the second transceiver unit is mounted on a trailer connected to the vehicle. The method also comprises determining at least one parameter relating to the trailer, while taking into account the distance between the first transceiver unit and the second transceiver unit.

As a result, a wide variety of parameters relating to the trailer may be determined in a simple manner.

The determination of the distance between the first transceiver unit and the second transceiver unit can comprise transmitting at least one signal between the first transceiver unit and the second transceiver unit. Transceiver units are often already arranged on the vehicle and on the trailer for a wide variety of applications, so that units which are already available can be used to determine the distance between the transceiver units and the subsequent determination of the parameters. For example, transceiver units can already be found in various radio camera systems which are already arranged on the trailer for other applications. That is to say new hardware may not be required.

The determination of the distance between the first transceiver unit and the second transceiver unit can furthermore comprise determining the received field strength of the signal sent between the first transceiver unit and the second transceiver unit.

Alternatively, determining the distance between the first transceiver unit and the second transceiver unit may comprise determining the transit time of the signal sent between the first transceiver unit and the second transceiver unit.

As a result, the distance can be determined in a simple manner with sufficient accuracy.

The transmission of the at least one signal between the first transceiver unit and the second transceiver unit may comprise modulating the at least one signal onto at least two different carrier frequencies. As an alternative to this, at least two signals, each with a different carrier frequency, may also be transmitted.

The determination of the at least one parameter relating to the trailer may comprise determining the length of the trailer on the basis of the determined distance, the distance between the first transceiver unit and a front edge of the trailer, and a horizontal offset between the second transceiver unit and the first transceiver unit.

Knowledge of the length of a trailer may be required for a wide variety of driver assistance systems.

The length of the trailer may be determined while the vehicle is driving straight ahead. When driving straight ahead, simple geometric principles may be used to determine the length of the trailer.

Determining the at least one parameter relating to the trailer can also comprise determining an articulation angle between the vehicle and the trailer on the basis of the determined distance, the distance between the first transceiver unit and a pivot point of the trailer, and the length of the trailer.

Knowledge of the articulation angle between a trailer and the vehicle may be used for a wide variety of driver assistance systems.

The articulation angle may be determined while the vehicle is cornering.

When driving straight ahead, the articulation angle between vehicle and trailer is known. A determination process is therefore necessary only when cornering.

The determination of the at least one parameter relating to the trailer can furthermore also comprise determining the distance between a further transceiver unit and the second transceiver unit, wherein the further transceiver unit is mounted on the vehicle at a different position than the first transceiver unit.

The determination of the at least one parameter relating to the trailer can furthermore comprise determining the position of the second transceiver unit by using trilateration or multilateration methods taking into account the distances between the transceiver units on the vehicle and the second transceiver unit on the trailer.

Camera systems of driver assistance systems are often only temporarily mounted on a trailer. The position of the camera systems can therefore vary. However, knowledge of the position of a camera system in relation to a vehicle may be required for a wide variety of driver assistance systems.

This means that the determined parameters can then be used, for example, for a wide variety of driver assistance systems.

A device for determining parameters relating to a trailer is also described. The device has a first transceiver unit which is designed to be mounted on a vehicle, and a second transceiver unit which is designed to be mounted on a trailer connected to the vehicle. The device is designed to determine a distance between the first transceiver unit and the second transceiver unit when the first transceiver unit is mounted on the vehicle and the second transceiver unit is mounted on the trailer. The device is also adapted to determine at least one parameter relating to the trailer, including the distance between the first transceiver unit and the second transceiver unit.

The device may also be designed to transmit at least one signal between the first transceiver unit and the second transceiver unit wherein the first transceiver unit is mounted on the vehicle and the second transceiver unit is mounted on the trailer.

The device may also be designed to determine the received field strength of the signal transmitted between the first transceiver unit and the second transceiver unit.

The device may furthermore be designed to determine the transit time of the signal sent between the first transceiver unit and the second transceiver unit.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The invention is explained in more detail below on the basis of the figures of the drawing, wherein identical or similar elements are provided with the same reference signs.

In the figures.

DETAILED DESCRIPTION

Figure 1:
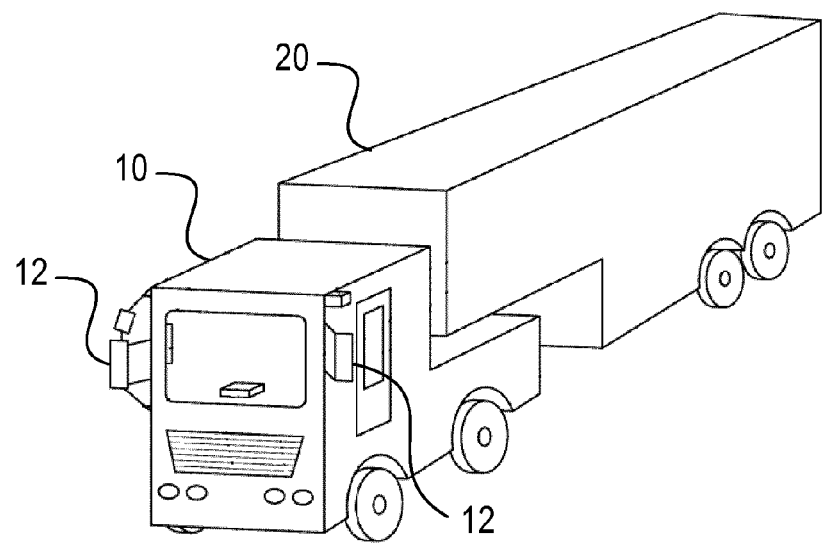
FIG. 1 shows a sketch of a vehicle with a trailer.

FIG. 1 shows a sketch of a vehicle 10 with a trailer 20. In the illustrated example, the vehicle 10 is a truck. This is just an example, however. In principle, any suitable vehicle (e.g. a car) can be used as the towing vehicle. The trailer 20 can partially rest on the vehicle 10 (so-called semi-trailer). The trailer 20 can, however, also be suitably connected to the vehicle 10 in any other manner, for example via a drawbar.

The vehicle 10 generally has exterior mirrors 12 in order to enable the driver to see areas next to and behind the vehicle 10 and the trailer 20 while driving. However, the field of vision is restricted when there are exterior mirrors 12. In particular, areas (in the middle) behind the trailer 20 can only be seen to a very limited extent or not at all, since they are covered by the trailer 20.

Therefore, many vehicles nowadays have a wide variety of driver assistance systems which enable the driver to also see areas that are partially or completely covered by the vehicle 10 and/or by the trailer 20. For example, various camera units can be mounted on the vehicle 10 and/or on the trailer 20, which camera units record images of the surroundings of the vehicle 10 and of the trailer 20. These images may be presented to the driver in a suitable perspective on one or more displays in or on the vehicle 10. For example, it may be made possible for the driver to see what is known as the blind spot. In this case, however, what is shown on the at least one display is not limited only to areas that cannot be viewed or can only be viewed to a limited extent using conventional mirrors. Areas that the driver may see by means of conventional side mirrors or through the front or side windows of the vehicle 10 can also be shown on displays.

For example, so-called exterior mirror replacement systems, often also referred to as camera monitor systems, are known. In such a case, the conventional exterior mirrors are completely replaced by displays. For example, displays that replace the mirror glass can be arranged in the side mirrors outside the vehicle. The driver is then shown camera recordings in the side mirrors, which are recorded by corresponding camera units. However, it is also possible that the side mirrors are completely omitted and replaced by displays inside the vehicle. On the one hand, this can increase safety, since objects and obstacles can be detected more reliably by the driver. On the other hand, for example by installing displays inside the vehicle and eliminating exterior mirrors, fuel emissions and the noise level when driving can be reduced, as the aerodynamics of the vehicle are improved.

However, in order to actually be able to increase safety, it is necessary that suitable image sections are displayed on the corresponding displays. Depending on the driving situation, different areas relating to the vehicle 10 and the trailer 20 can be relevant for the driver. The relevant image areas should also be suitably scaled depending on the situation, since with the replacement systems the driver cannot change his field of vision by moving his head in a suitable manner, as with conventional mirrors. For the scaling and the suitable selection of the image section, it is often necessary for various vehicle parameters to be known. For example, it may be necessary for the length of the trailer 20 to be known in order to be able to reliably display images in the region of the rear edge of the trailer 20.

Figure 2:
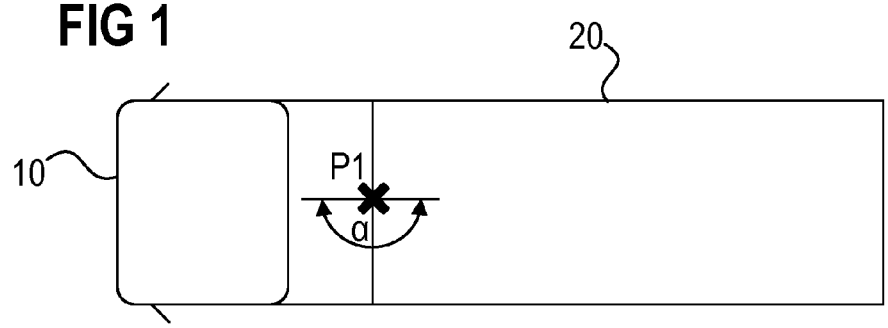
FIG. 2 shows a schematic plan view of a vehicle with a trailer when driving straight ahead.
Figure 3:
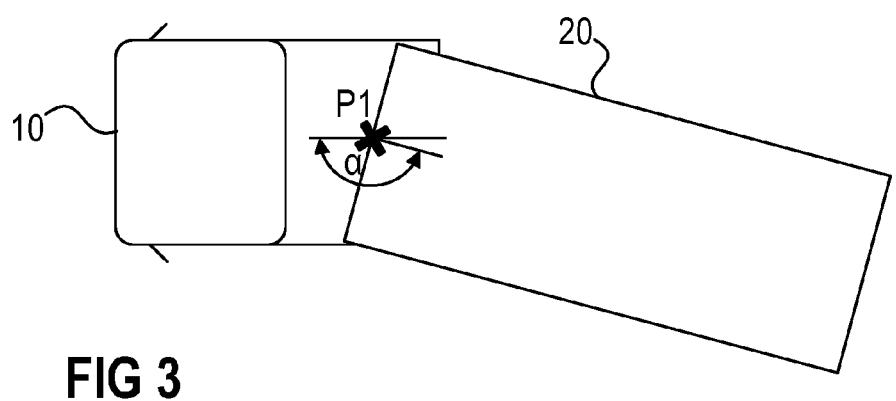
FIG. 3 shows a schematic plan view of a vehicle with a trailer when cornering.

It is also often necessary to know the articulation angle $\alpha$ between the vehicle 10 and the trailer 20. When driving straight ahead, for example, the articulation angle $\alpha$ is essentially 180° (cf., for example, FIG. 2) and can assume values of <180° when cornering (cf., for example, FIG. 3). In FIGS. 2 and 3, the pivot point P1 about which the trailer 20 can rotate when cornering is shown.

The images shown on the at least one display may be recorded by one or more cameras which can be arranged on the vehicle 10 and/or on the trailer 20. In this context, systems are known in which the cameras are not permanently attached to the trailer 20, but rather only temporarily. Some camera systems may be mounted on the trailer 20 only when required, for example by means of suction cups, magnets or the like. In such cases, the exact mounting position of the cameras may not be known. However, in order to be able to show suitable areas with appropriate scaling on the at least one display, it may be necessary for the mounting position of the cameras to be known. An example of a method for determining the mounting position of a camera is described further below with reference to FIG. 6.

Figure 4:
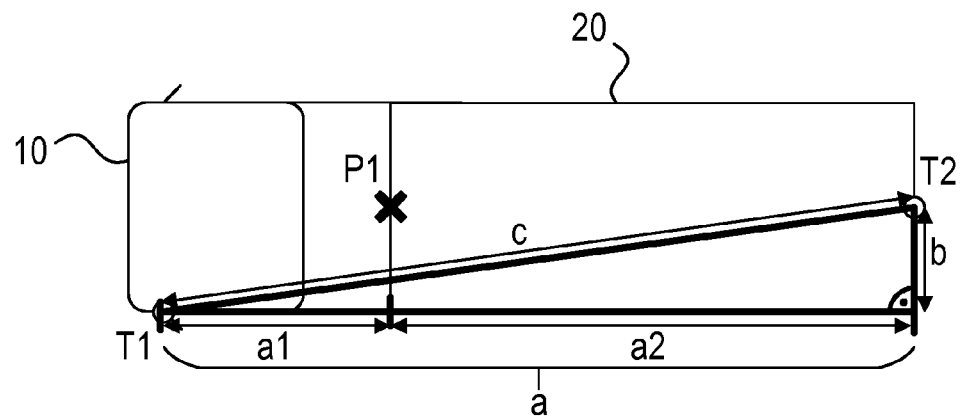
FIG. 4 shows a sketch of various dimensions of a vehicle with a trailer.

FIG. 4 shows an example of how the length a2 of a trailer 20 can be determined. Various parameters are assumed to be known here. For example, the length a1 of the vehicle 10 is usually known. Since a driver assistance system is usually permanently installed in a vehicle 10 and the parameters of the vehicle 10 (e.g. length and width) do not change, it is sufficient if these parameters are entered into the system once. These can then be used at any time for the later determination of further parameters. While a driver assistance system can usually be permanently assigned to a vehicle 10, various trailers 20 can be towed by the vehicle 10. Therefore, the dimensions of a trailer 20 connected to the vehicle 10 cannot be permanently stored in the system. Different trailers 20 can be of different lengths, for example. In contrast, the width of a trailer 20 towed by a vehicle 10 may correspond to the width of the vehicle 10. The width of the trailer 20 may thus be assumed to be known since the width of the vehicle 10 is usually known.

To determine the length a2 of the trailer 20, a first transceiver unit T1 is mounted on the vehicle 10. The first transceiver unit T1 can, for example, be connected to a camera unit which is arranged on the vehicle 10 in order to record suitable images. Many camera systems transmit the image data wirelessly to an evaluation unit (not shown) in the vehicle 10. As a result, many camera units are already equipped with appropriate transceiver units as standard, and existing units can be used. A second transceiver unit T2 can be arranged on the trailer 20. The second transceiver unit T2 can, for example, be attached to the right or left rear edge of the trailer 20. This makes it possible to achieve a high quality radio connection to the first transceiver unit T1, since the signals sent are not shadowed, or only slightly shadowed, by the trailer 20. If the second transceiver unit T2 is arranged, for example, at other positions on the trailer 20, parts of the trailer 20 can lie in the direct path between the first and the second transceiver unit T1, T2. As a result, the radio link can sometimes be significantly disrupted, for example by shadowing effects. The second transceiver unit T2 can, for example, also be connected to a camera unit mounted on the trailer 20. Camera units that are arranged (temporarily or permanently) on a trailer 20 also frequently transmit image data wirelessly to an evaluation unit (not shown) in the vehicle 10. This means that existing components can also be used for the second transceiver unit T2.

Signals can be sent between the first transceiver unit T1 and the second transceiver unit T2. The distance c between the first transceiver unit T1 and the second transceiver unit T2 may be determined on the basis of these signals. For example, the received field strength RSSI of one or more signals sent between the first transceiver unit T1 and the second transceiver unit T2 may be determined. The measured received field strength RSSI is an indication of the distance at which the transceiver units T1, T2 are arranged.

The signals sent between the transceiver units T1, T2 can be, for example, LF, HF, UWB (Ultra-wideband), Bluetooth or BLE signals (Bluetooth Low Energy signals). However, HF signals, LF signals and Bluetooth or Bluetooth low energy signals are only examples. Various other communication links can be used to determine the trailer length.

Instead of determining the received field strength RSSI of such signals, the distance c between the transceiver units T1, T2 may, however, also be determined, for example, on the basis of a transit time measurement of the transmitted signals. For example, signals may be transmitted by the first transceiver unit T1. The point in time at which each of the signals is transmitted may be known. The second transceiver unit T2 receives the signals and sends corresponding response signals back to the first transceiver unit T1. The speed of propagation of the transmitted signals is known (speed of light). In addition, the processing time in the second transceiver unit T2, which is required to receive and process the signals received by the first transceiver unit T1 and to send back corresponding response signals, is also known. The distance covered by the signals can be determined from the time of reception of the response signals in the first transceiver unit T1 and from all other known parameters, said distance corresponding to the distance c between the first transceiver unit T1 and the second transceiver unit T2. It is possible to determine both the transit times of the signals from the first to the second transceiver unit T1, T2 and the transit times of the signals from the second to the first transceiver unit T2, T1 (also known as "Round Trip Time of Flight", RTOF). However, it is also possible to determine only the transit time of the signals in one of the two directions (also known as "Time of Arrival", TOA).

If the distance c between the first and the second transceiver units T1, T2 is known, for the determination of the length a2 of the trailer 20 it may be assumed that the position of the second transceiver unit T2 is known. For example, to determine the trailer length a2, it may be necessary for the second transceiver unit T2 to be arranged on the rear edge of the trailer 20 at a predetermined distance b from the lateral edge of the trailer 20. The position of the first transceiver unit T1 is also known. For example, the first transceiver unit T1 can be arranged on the side of the vehicle 10, as shown by way of example in FIG. 4. The distance a1 between the first transceiver unit T1 and the front edge of the trailer 20 is also known. The trailer length a2 is determined when driving straight ahead ($\alpha=180°$), as shown in FIG. 4 for example.

As shown in FIG. 4, a right-angled triangle can be formed from the various known and unknown dimensions. Using the equation $a^2+b^2=c^2$ (Pythagorean theorem), the trailer length a2 can then easily be calculated, where $a=a1+a2$.

In the determination of the trailer length a2 shown above as an example, it is assumed that the first transceiver unit T1 and the second transceiver unit T2 are arranged at the same height, for example 2 m above the ground, 3 m above the ground or 4 m above the ground. In principle, however, the first transceiver unit T1 can also be mounted at a different height than the second transceiver unit T2. If the difference in height is known, this can be included in the calculation of the trailer length a2. If the difference in height is not known, inaccuracies may result in the determination of the trailer length a2. The greater the difference in height, the greater the inaccuracy. However, in such cases, the inaccuracies are usually relatively small and can be ignored.

If the length a2 of the trailer 20 is known, the articulation angle $\alpha$ between the vehicle 10 and the trailer 20 can be determined in a similar manner. It is irrelevant here whether the length a2 of the trailer 20 was determined by the method described above or in some other way. While cornering (cf. FIG. 5), the distance e between the first transceiver unit T1 and the second transceiver unit T2 can be determined in the manner described above (RSSI measurement, transit time measurement) by sending signals between the transceiver units T1, T2. In addition to the length a2 of the trailer 20, the distance d between the first transceiver unit T1 and the pivot point P1 is also known. The distance between the first transceiver unit T1, which is fixedly arranged on the vehicle 10, and the pivot point P1 is constant, regardless of which trailer 20 is connected to the vehicle 10. This value can therefore be entered once in the system and saved there.

From the known edge lengths a2, d, e of the triangle formed by the transceiver units T1, T2 and the pivot point P1, the angle γ can be calculated, for example using the cosine law. In this context the following applies:

$$e^2 = a2^2 + d^2 - (2 \times a2 \times d \times \cos\gamma) \text{ or} \quad (1)$$

$$\cos\gamma = \frac{a2^2 + d^2 - e^2}{2 \times a2 \times d} \quad (2)$$

The angle β between the connecting line d, which runs between the first transceiver unit T1 and the pivot point P1, and a line x, which runs through the vehicle 10 and divides it into two halves, is also known. This angle β remains unchanged at all times and can therefore be stored in the system for later use.

The articulation angle α is then calculated from the angles β and γ as α=β+γ.

When calculating the articulation angle α, it is again assumed that the first transceiver unit T1 and the second transceiver unit T2 are arranged at the same height, that is to say for example 2 m above the ground, 3 m above the ground or 4 m above the ground. If the transceiver units T1, T2 are not arranged at the same height, the corresponding difference in height can also be taken into account in the calculation of the articulation angle. If a possibly existing difference in height is not taken into account, this results in inaccuracies in the calculation of the articulation angle α, the inaccuracies being greater, the greater the difference in height. However, the inaccuracies are usually relatively small and can be ignored.

As already explained above, camera units or transceiver units T2 may possibly not be permanently connected to the trailer 20 and only be mounted when necessary. It can be the case that the camera unit, or transceiver unit T2, is mounted on the trailer 20 at an unknown position. The position of a transceiver unit T2 in relation to a vehicle 10 with a trailer 20 can be determined, for example, on the basis of a field strength measurement. Two or more transceiver units T11, T12 can be arranged on the vehicle 10 at certain (known) positions (see FIG. 6). Signals can be sent between the transceiver units T11, T12 arranged on the vehicle 10 and the second transceiver unit T2 arranged on the trailer 20. The received field strength RSSI of these signals can be measured, and the position of the second transceiver unit T2 can be determined on the basis of the received field strength RSSI. As already described above, the reception field strength RSSI of a signal decreases with greater distance from the transmitter.

Figure 6:
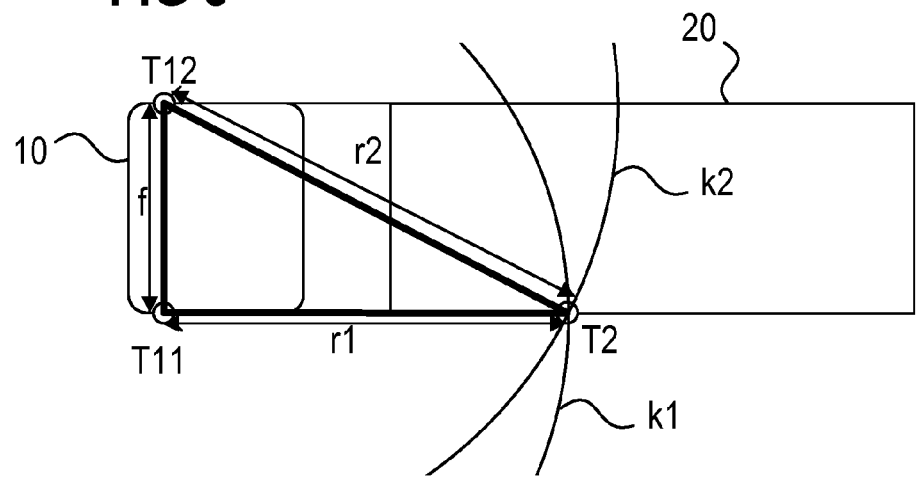
FIG. 6 shows a sketch of a method for determining the position of a camera in relation to a vehicle with a trailer.

In FIG. 6, two transceiver units T11, T12 in vehicle 10 are shown by way of example. However, more transceiver units Tin can be arranged at any suitable positions in the vehicle 10. The at least two transceiver units T11, T12 can be connected to a control device (not shown in FIG. 6). The control device can be designed to transmit signals via the transceiver units T11, T12. Signals received by the transceiver units T11, T12 can in turn be sent to the control device for further evaluation.

For example, LF, HF, UWB, Bluetooth or BLE signals (Bluetooth Low Energy signals) can be transmitted by the transceiver units T11, T12 arranged in the vehicle 10. These signals are received by the second transceiver unit T2. The second transceiver unit T2 can measure the received field strength RSSI of the received signals. Since the position of the transceiver units T11, T12 in the vehicle 10 and the field strength with which the signals are transmitted are known, the distance between the second transceiver unit T2 and each of the first transceiver units T11, T12, and thus the position of the second transceiver unit T2 relative to the vehicle 10, can be determined using the received field strength RSSI of the corresponding signals which has been determined at a point in time.

As described above, signals can be transmitted by the transceiver units T11, T12 in the vehicle 10 and received by the second transceiver unit T2. In principle, however, it is also possible for the second transceiver unit T2 to transmit signals and for each of the first transceiver units T11, T12 in the vehicle 10 to determine the received field strengths RSSI of these signals. The second transceiver unit T2 can thus also serve as a transmitter and the first transceiver units T11, T12 in the vehicle 10 as a receiver. The further away the second transceiver unit T2 is from a first transceiver unit T11, T12, the lower the measured received field strength RSSI of the signals. The distance from the second transceiver unit T2 to each of the first transceiver units T11, T12 can then in turn be determined from the measured reception field strength or the measured reception field strengths. If the distance to each individual one of the first transceiver units T11, T12 is known, the position of the second transceiver unit T2 in relation to the vehicle 10 can in principle be inferred. With two or more transceiver units Tin in the vehicle 10, the position of the second transceiver unit T2 can be determined, for example, by means of suitable trilateration or multilateration methods.

This is illustrated by way of example in FIG. 6. If the distance between the second transceiver unit T2 and a first transceiver unit T11 is known, this means that the second transceiver unit T2 is located somewhere on a circular arc k1 around the transceiver unit T11. The radius r1 of the circular arc k1 corresponds to the determined distance between the first transceiver unit T11 and the second transceiver unit T2. The same applies to other transceiver units T12, .... In FIG. 6, only two first transceiver units T11, T12 and associated circular arcs k1, k2 are shown in sections. The point of intersection of the circular arcs k1, k2 corresponds to the position of the second transceiver unit T2. With only two transceiver units T11, T12 in the vehicle 10, there are basically two intersection points, the second intersection point not being shown in FIG. 6. One of the two points of intersection can be excluded on the basis of certain logical criteria, for example. If more than two transceiver units Tin are arranged in the vehicle 10, the position of the second transceiver unit T2 can usually be clearly determined.

Instead of the received field strength measurement RSSI, however, the position of the second transceiver unit T2 can also be determined, for example, as already described above in relation to the trailer length a2, on the basis of a transit time measurement of signals sent between the first transceiver units T11, T12 in the vehicle 10 and the second transceiver unit T2. It is in turn possible to determine both the transit times of the signals from a first transceiver unit T11, T12 to the second transceiver unit T2 and the transit times of the signals from the second transceiver unit T2 to the corresponding first transceiver unit T11, T12 to be determined ("Round Trip Time of Flight", RTOF). However, in principle only the transit time of the signals in one of the two directions can be determined here ("Time Of Arrival", TOA).

These methods (TOA, RTOF) also result in circular arcs k1, k2 around the corresponding first transceiver units T11, T12, on which the position of the second transceiver unit T2 lies. As already described above in relation to the RSSI method, the position of the second transceiver unit T2 can again be determined from the intersection points of these circular arcs k1, k2.

For example, the transmitted signals can be attenuated (shadowing or fading effects) by obstacles (for example parts of the trailer) in the radio path between the transceiver units T1, T2. How much a signal is attenuated depends, for example, on the carrier frequency of the signal. For this reason, for example, the signal can be modulated onto at least two different carrier frequencies. Since different frequencies are affected to differing degrees by shadowing effects, the probability can be increased that the signal with at least one of the carrier frequencies can be received by the receiver. For example, a signal could be transmitted at both a frequency of 2.4 GHz and a frequency of 5 GHz. However, other frequencies are also possible. The signal can be transmitted with the same standard on different frequencies. However, it is also possible to transmit the signal on different frequencies using different standards. In principle, it is also possible to transmit two different signals at different frequencies so that at least one of the signals can be received by the receiver.

FIG. 6 shows the determination of the position of the second transceiver unit T2, for example in two-dimensional space. However, electromagnetic fields generally propagate in all spatial directions. The second transceiver unit T2 can thus be arranged in three-dimensional space anywhere on the surface of a sphere with the specific radius r1, r2 around the corresponding transceiver unit T11, T12. The principles explained in two-dimensional terms with reference to FIG. 6 can, however, easily be transferred to three dimensions. The more first transceiver units Tin are used for determining the position, the greater the accuracy of the determined position. As described above, when determining the position in two-dimensional space, it can be assumed that the transceiver units are arranged on the trailer at the same height, but without the exact mounting height of the transceiver units being known, which can result in inaccuracies. In three-dimensional space, such an assumption (transceiver units at the same height) is basically not necessary. However, for unambiguous determination of positions, at least three first transceiver units Tin are generally required in the vehicle.

Figure 5:
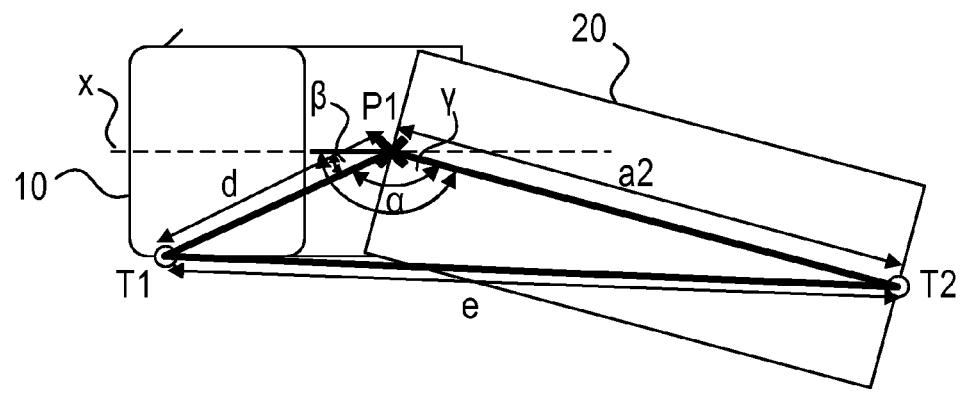
FIG. 5 shows a sketch of various dimensions of a vehicle with a trailer.

In FIGS. 4 to 6, the first transceiver units Tin are mounted in the vehicle 10 on the outside of the vehicle 10, for example. This is just an example, however. The first transceiver units Tin can in principle also be arranged inside the vehicle, for example in a control unit. However, the geometrical principles shown by way of example for determining the desired sizes can be applied in a similar manner here.

The desired vehicle parameters (trailer length, articulation angle, etc.) can only be determined once in a specific driving situation. However, it is also possible to repeat the measurements described above. The trailer parameters determined in this way can then be averaged over several successive measurements in order to refine the results. Measurements obviously recognized as incorrect measurements here can, for example, be disregarded. When determining the trailer length a2, it is possible, for example, to disregard measurements that were carried out while cornering. For example, filters can also be used (eg. Kalman filters).

The determination of the articulation angle $\alpha$ can, for example, also be further refined with the aid of further information or parameters, such as, for example, temporal tracking of the steering wheel position, trailer edge detection using image information, etc.

In FIGS. 4 and 5, only a first transceiver unit T1 is shown. The respective parameters (trailer length, articulation angle, etc.) can, however, also be determined, for example, by more than one transceiver unit T1 arranged in the vehicle 10. This also allows measurements to be refined and verified.

Measurements can also be refined and verified by using two (or more) transceiver units on the trailer 20. For example, it is possible to provide two camera systems or two transceiver units on the trailer 20, of which one transceiver unit is mounted on the right and the other transceiver unit is mounted on the left of the trailer 20. In such a case, the distance between these two transceiver units arranged on the trailer 20 can be assumed provisionally with the maximum permissible vehicle width f if the actual distance between the transceiver units is not known.

The parameters determined in this way can then be used, for example, by a wide variety of driver assistance systems. For example, camera units can specifically record the area around the rear edge of the trailer if the trailer length a2 and the articulation angle $\alpha$ are known. In this way, these areas can be shown to the driver in a targeted manner on the displays of an exterior mirror replacement system. This can be of particular interest, for example, when parking. During the journey, for example, different areas can be shown to the driver on displays (e.g. a blind spot). When overtaking, other areas can be of interest to the driver and displayed accordingly.

If the position of the camera units which are (temporarily) mounted on the trailer 20 is known, for example auxiliary lines can be displayed in the image sections that represent the width of the trailer 20, for example so as not to hit any obstacles when reversing. In addition, knowing the various parameters also makes it possible to display additional maneuvering assistance information.

In so-called surround view systems, knowing the exact position of the camera unit can, for example, simplify the calibration of the system. Knowledge of the vehicle geometry and of the trailer geometry can also be used, for example, by automated parking systems in which the vehicle 10 parks independently without the intervention of a driver. However, additional parameters may be required for this. Furthermore, knowledge of the various parameters also enables the automatic loading and unloading of trailers 20 and the correct positioning of drones in relation to the trailer 20 or to the vehicle 10. A recommended speed for the vehicle 10 with the corresponding trailer 20 can also be determined, for example, on the basis of the determined articulation angle $\alpha$.

The principles of the invention are described above using a truck with a trailer. In principle, however, these principles can also be applied to any other vehicle with a trailer, such as, for example, passenger cars, and agricultural or industrial vehicles. The principles can also be applied to vehicles for moving aircraft or to other vehicles for use on runways. The transceiver units described can be integrated into camera units, connected to camera units or arranged independently of camera units on the vehicle 10 and/or on the trailer 20.

According to one example, a camera system for a surround view system is temporarily mounted on the rear of a trailer by means of a suction cup. The camera system sends image information to a control device in the towing vehicle via WLAN. In existing systems, the functionality for determining the trailer parameters can, for example, be retrofitted in existing control devices by means of a software update. The distance between the camera system on the trailer and the control device in the vehicle can, for example, be determined regularly at a time interval of 100 ms. The determined distance can be sent to one or more displays of a driver assistance system via a vehicle bus (eg. CAN bus). The driver assistance system can for example be an exterior mirror replacement system which has displays arranged on the side of the vehicle (for example on the A pillar). The displays can in turn have control devices which receive the determined distance via the vehicle bus and use this to calculate the trailer length and the articulation angle. The geometry of the vehicle can be known in the control devices. It can also be assumed that the camera system is mounted at the rear of the trailer, in the center at a height of 4 m. The position of the vertical lateral rear edges of the trailer can then be determined from all the known parameters for example, and the corresponding area can be displayed accordingly on the displays.

The image section of the displayed images can be selected according to the current driving situation. For example, when the trailer is in a deflected position, only a small part of the trailer or the side trailer tarpaulin can be displayed when cornering. Most of the display can be used to show the part of the surroundings to the side of the trailer's rear edge that is more interesting for the driver. This can make maneuvering much easier for the driver, especially when driving backwards. Inaccuracies in determining the distance between the camera system and the control device as well as the possibly imprecise assumption regarding the mounting position of the camera system on the trailer are acceptable, since these inaccuracies only have a minor influence on the image section which is actually displayed.

According to a further example, a rear-view camera is temporarily mounted on the trailer of an agricultural utility vehicle by means of a magnet. In this example, the mounting position is not in the center due to the design of the trailer. The rear-view camera sends its image data via a radio link to two receivers, which are installed in the exterior mirrors of the towing vehicle. Inexpensive hardware for determining distances using RTOF is installed in both the transmitter (rear-view camera) and in the receivers. During a relatively long straight-ahead drive, which can be recognized by tracking the steering angle or, if this is not available, by recognizing the optical flow in the camera image or by means of acceleration sensors, the horizontal mounting position of the rear-view camera on the rear wall of the trailer is determined by means of trilateration. A mounting height of 2 m above the ground is assumed, for this example. Since only two receivers are available in the present example, the actual mounting height cannot be absolutely determined and must therefore be assumed to be a predetermined value, or at least the same value as one another. Two or more receivers are generally required to determine the exact mounting height.

Alternatively, the mounting height of the camera can be determined on the basis of the angle of inclination of the camera (e.g. determination by means of a gyro sensor), the intrinsic camera parameters, the vehicle speed and/or the optical flow. Since, in this example, the vehicle is driving straight ahead, the articulation angle can be assumed to be 180°. If the driver reverses later, for example for the purpose of maneuvering or parking, the information about the horizontal position of the camera can be used to show two (inverse) drag curves for the left and right trailing edges of the trailer in the rear-view camera image, which curves show the driver which area or which objects in the environment are affected by the reversing trailer at a given steering angle. A (minor) inaccuracy when determining the distance between the rear-view camera and receivers using RTOF and a possibly imprecise assumption about the mounting height of the camera can be added according to the drag curves for safety reasons. As a result, the drag curves can be shifted slightly outward, for example in the camera image.

Figure 7:
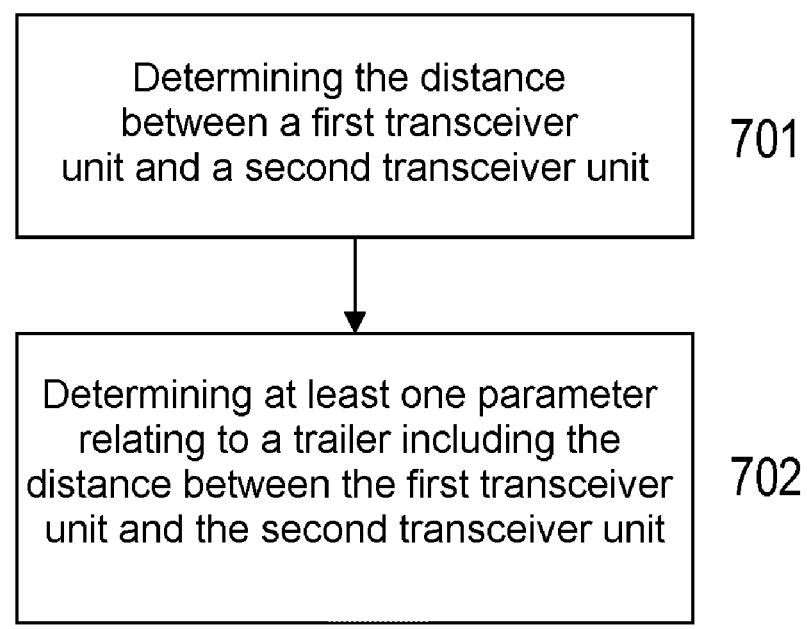
FIG. 7 shows a flow diagram of a method for determining vehicle parameters.

FIG. 7 shows a flow chart of a method for determining vehicle parameters. The method comprises determining the distance between a first transceiver unit and a second transceiver unit with a control device, wherein the first transceiver unit is mounted on a vehicle and the second transceiver unit is mounted on a trailer connected to the vehicle. The method also comprises determining at least one parameter relating to the trailer, while taking into account the distance between the first transceiver unit and the second transceiver unit.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the scope of the following claims.

The invention claimed is:

1. A method which comprises:
   determining the distance between a first transceiver unit and a second transceiver unit, wherein the first transceiver unit is mounted on a vehicle and the second transceiver unit is mounted on a trailer which is connected to the vehicle; and
   determining at least one parameter relating to the trailer, taking into account the distance between the first transceiver unit and the second transceiver unit, wherein the first transceiver unit is integrated into a camera unit and is arranged laterally along a side of the vehicle, wherein the second transceiver unit is integrated into a radio camera system and is arranged on a rear edge of the trailer at a distance from the lateral edge of the trailer, and wherein determining the at least one parameter relating to the trailer comprises determining the length of the trailer on the basis of the determined distance, the distance between the first transceiver unit and a front edge of the trailer, and a horizontal offset between the second transceiver unit and the first transceiver unit.

2. The method as claimed in claim 1, wherein determining the distance between the first transceiver unit and the second transceiver unit further comprises transmitting at least one signal between the first transceiver unit and the second transceiver unit.

3. The method as claimed in claim 2, wherein determining of the distance between the first transceiver unit and the second transceiver unit further comprises at least one of:
   determining the received field strength of the signal sent between the first transceiver unit and the second transceiver unit; and
   determining the transit time of the signal sent between the first transceiver unit and the second transceiver unit.

4. The method as claimed in claim 2, wherein transmitting the at least one signal between the first transceiver unit and the second transceiver unit further comprises one of:
   modulating the at least one signal onto at least two different carrier frequencies; and wherein at least two signals each with a different carrier frequency are transmitted.

5. The method as claimed in claim 1, wherein determining the at least one parameter relating to the trailer further comprises determining a vertical offset between the second transceiver unit and the first transceiver unit.

6. The method as claimed in claim 1, wherein determining the at least one parameter relating to the trailer further comprises:
determining an articulation angle between the vehicle and the trailer on the basis of the determined distance, the distance between the first transceiver unit and a pivot point of the trailer, and the length of the trailer.

7. The method as claimed in claim 1, wherein determining the at least one parameter relating to the trailer further comprises:
determining the distance between a further transceiver unit and the second transceiver unit, wherein the further transceiver unit is mounted on the vehicle at a different position than the first transceiver unit.

8. The method as claimed in claim 7, wherein determining the at least one parameter relating to the trailer further comprises:
determining the position of the second transceiver unit using trilateration or multilateration methods, taking into account the distances between the transceiver units on the vehicle and the second transceiver unit on the trailer.

9. The method as claimed in claim 1, further comprising using the at least one specific parameter to control a driver assistance system.

10. A device comprising:
a first transceiver unit which is designed to be mounted on a vehicle;
a second transceiver unit which is designed to be mounted on a trailer connected to the vehicle; and
a control device having instructions for:
determining a distance between the first transceiver unit and the second transceiver unit when the first transceiver unit is mounted on the vehicle and the second transceiver unit is mounted on the trailer; and
determining at least one parameter relating to the trailer, taking into account the distance between the first transceiver unit and the second transceiver unit, wherein the first transceiver unit is integrated into a camera unit and is arranged laterally along a side of the vehicle, wherein the second transceiver unit is integrated into a radio camera system and is arranged on a rear edge of the trailer at a distance from the lateral edge of the trailer, and wherein determining the at least one parameter relating to the trailer comprises determining the length of the trailer on the basis of the determined distance, the distance between the first transceiver unit and a front edge of the trailer, and a horizontal offset between the second transceiver unit and the first transceiver unit.

11. The device as claimed in claim 10, wherein the control device further comprises instructions for transmitting at least one signal between the first transceiver unit and the second transceiver unit when the first transceiver unit is mounted on the vehicle and the second transceiver unit is mounted on the trailer.

12. The device as claimed in claim 11, wherein the control device further comprises instructions for determining the received field strength of the signal sent between the first transceiver unit and the second transceiver unit.

13. The device as claimed in claim 11, wherein the control device further comprises instructions for determining the transit time of the signal sent between the first transceiver unit and the second transceiver unit.

\* \* \* \* \*